United States Patent Office 3,838,055
Patented Sept. 24, 1974

3,838,055
HIGH IMPACT, ARC TRACK AND WEATHER RESISTANT HIGH VOLTAGE ELECTRICAL INSULATOR
William M. Rinehart, Centralia, Mo., assignor to A. B. Chance Company, Centralia, Mo.
No Drawing. Continuation-in-part of abandoned application Ser. No. 131,800, Apr. 6, 1971. This application Sept. 12, 1972, Ser. No. 288,413
Int. Cl. H01b 3/00
U.S. Cl. 252—63.2                                   17 Claims

ABSTRACT OF THE DISCLOSURE

An arc track resistant, high impact, filler free polymeric high voltage electrical insulator which is antichalking under normal operating conditions and in its preferred form comprises an elongated body having integral, spaced skirts and cast from a composition including a 2,2-bis(p-hydroxyphenyl)propane-glycidyl ether polymer, a curing agent for the resin, from 15% to 65% by weight of an aliphatic polyglycidyl ether or ester, and from 0.01% to 3% by weight of an alkylidene bis, tris, or polyphenol. The resin composition is especially adapted to be molded over a supporting member of 2,2-bis(p-hydroxyphenyl) propane-glycidyl ether polymer reinforced with glass fibers. The resulting product has superior dielectric, mechanical and impact strength along with good electrical resistance and weatherability, and is capable of undergoing controlled erosion under high electrical load and temperature conditions before tracking can occur.

---

This is a continuation-in-part of my copending application Ser. No. 131,800, filed Apr. 6, 1971, entitled High Impact, Arc Track and Weather Resistant Castable Resin Composition, now abandoned.

This invention relates to elongated polymeric type electrical insulators which are free of filler and fabricated of a composition including a base resin normally considered non-track resistant, but which is combined with modifiers which increase the flexibility of the insulator products formed therefrom to an extent that the insulators not only have good dielectric and electrical resistance characteristics, but also have high impact strength, arc track resistance and good weatherability. The resin composition has particular utility as a covering to be molded over an elongated glass fiber reinforced synthetic resin member which has superior mechanical properties, but does not possess the arc track resistance and weatherability of the layer placed thereover.

BACKGROUND

Porlain has long been the material of choice for the construction of outdoor, high voltage electrical insulators because it has: (1) outstanding weathering resistance; (2) superior arc resistance; (3) high compressive strength; and (4) fairly successful ways have been found to design around and live with the inherent limitations of the material. However, the high weight to strength and brittleness of porcelain insulators is a severe problem from a fabrication, handling and use standpoint, resulting in a relative high loss factor. Also, in contaminated areas, porcelain insulators must be coated with a grease-like material that encapsulates dirt particles, keeping them from forming a conducting path on its surface. In order to avoid flashover problems, porcelain insulators must be cleaned and recoated every six months to two years depending on the local condition—a very costly but necessary operation. As a consequence there has been a very real demand for synthetic resin insulators which do not possess the limitations of porcelain and can compete with the long range durability of the latter.

Development programs designed to find a substitute for porcelain have received substantial support both in funds and research time over an extended period of time, but have met only limited success because of the inability of others to develop a composition meeting all of the necessary parameters of low weight per unit volume, high mechanical and impact strength, arc track resistance, good weatherability, adequate electrical resistance, ability to be formed or cast into any desired shape or configuration, and availability in commercially usable quantities at an economical cost. Principal efforts to find a satisfactory replacement for porcelain based products having sufficient insulation properties to permit their use in high voltage electrical applications have been directed toward development of synthetic resin compositions having electrical characteristics equal to or exceeding those of porcelain, but of substantially less weight without increase in cost and/or sacrifice of the longevity of the structure.

Materials like the polyolefins, silicones and fluorocarbons have very good arc-track resistance. They can withstand high temperatures, and resist development of high surface leakage because they are hydrophobic and have surfaces which resist picking up and retention of contaminants thereon. However, these materials lack the mechanical strength for many applications and thus must be used as coatings over stronger less arc-resistant materials. When polyolefins, silicones and fluorocarbons are used as coatings there is a real danger of electrical failure at the interface under the coating resulting from the difficulty of obtaining good adhesion of the coating to the underlying support and inadequate coating thickness. Relatively thin coatings are generally proposed because of high material costs in the case of silicones and fluorocarbons.

Best results at a reasonable cost have heretofore been obtained for the most part by the use of curable, hydrophobic, thermosetting synthetic resins such as 2,2-bis(p-hydroxyphenyl)propane-glycidyl ether polymers (commonly called a glycidyl ether of a Bisphenol A-type epoxy and referred to herein for convenience as a BPA resin). If desired, the resin may be reinforced with a material having insulating properties such as glass fibers. BPA epoxy resins have heretofore been considered to be the most practical base material for porcelain substitutes since they more nearly meet all of the requirements outlined above at a reasonable cost. However, the actual commercial usage of BPA epoxy based insulating products in electrical applications has been rather limited because of relatively short life under a variety of operating conditions and the tendency of insulators formed therefrom to track, especially after exposure of the resin based products to the ambient atmosphere for an extended period of time, and poor electrical insulating characteristics in many instances.

For example, a conventional BPA epoxy resin has excellent electrical properties insofar as dielectric constant, mechanical strength, electrical resistance, and ability to be molded into any desired shape is concerned, but BPA resins cured with an anhydride and accelerated with an amine accelerator, have poor arc track resistance, especially after extended exposure of the insulating product to the atmosphere. A conventional BPA system can be modified to increase the arc track resistance thereof by addition of a filler such as hydrated alumina or the like. Fillers have not completely eliminated the problem though. Because of the problems encountered with BPA resin products, cycloaliphatic epoxies have been suggested as an alternate thereto (see for example, U.S. Pat. 3,511,922). The cycloaliphatics are of particular interest because, being aliphatic, they tend to burn with a clean flame; their organic content going to gaseous products, Aromatic materials on the other hand, burn with a dirty soot filled flame. Aromatic materials tend to form carbon when burned. Under arcing conditions aromatic systems (e.g. BPA) tend to form a carbon path (track) while the aliphatic systems erode. A further complicating factor was the discovery that aliphatic epoxy compositions do not develop the impact strengths of BPA systems, particularly when filled to reduce cost and reduce mold shrinkage.

Filling of epoxy systems presents still another problem because the arc track resistance of filled epoxy compositions decreases in proportion to the time the units are maintained in service and in accordance with the severity of the ambient conditions encountered during such use. Parts containing fillers such as hydrated aluminum develop a higher surface leakage when energized than is the case with unfilled parts. This higher surface leakage deleteriously increases the erosin rate of the surface of the part, and usually increases the operating temperature thereof to a point where the mechanical strength of the structure is significantly lowered. Units with high leakage currents also tend to have lower flash over values during wet contaminated conditions, which are a frequent occurrence in many geographic areas. Detailed examination of filled epoxy insulators prior to use and after extended service under load confirms the reason for impractically early failure. In considering the surface of a filled polymer insulator in service it can be recognized that in the new condition the surface of the insulator is resin rich. Very few filler particles are exposed. This outer hydrophobic skin is soon removed due to arcing action and/or weathering. The exposed filler thus causes water to cling to and wet out the surface. This condition can cause several things to occur:

1. Deleterious surface activity is created (arcing increases);
2. Leakage currents increase;
3. Temperatures rise;
4. Water evaporates from the surface faster;
5. Less water is available for washing contamination off the surface;
6. As water evaporates it deposits dissolved minerals on the surface;
7. Rate of contamination buildup increases, causing further activity;
8. When filler is bonded to the resin—
    (a) erosin is retarded; but
    (b) contamination starts to build up at an even more rapid rate; and
    (c) the surface becomes too conductive and an arc is sustained across the whole insulator.

The effect of fillers in epoxy systems on the arc track resistance of insulators formed therefrom can be empirically examined by placing rods made from the composition on a tracking wheel where the rods are energized to a level such as 10 KV and then rotated through a water spray located at the bottom of the arc of rotation thereof. Sample rods of unfilled BPA resin, preferably about 8 inches in length, subjected to tests of this character show that chalking on the surface of the members occurs within 5 to 24 hours, and that failure by tracking takes place anywhere from 20 to 100 hours after commencement of the test. It has been observed that chalking causes the surface to more quickly "wet out" and remain in that condition. Leakage currents correspondingly increase and temperatures go up causing rapid carbonization. As noted temperatures also encourage water evaporation and salt deposition which aggravates the tracking problem. The surface chalking derives from rigid, brittle epoxy matrix material which comes from the unreinforced resin rich outer surface portion of the epoxy body. The chalking is further believed to be attributable to mechanical failure on a microscale caused by high frequency intramolecular vibration producing surface crazing. Although the specific frequency which causes the damage is not known, it is believed to be in the infrared or ultra violet frequency ranges produced by the arcing that occurs throughout the time period during which the samples are energized. Crazing may also be caused by the alternating, localized thermal stressed traceable to the hot arc on the surface of the part followed by rapid cooling from rain or snow and consequent water evaporation. This mechanism can also produce damaging intramolecular vibration.

The most popular filler currently used in synthetic resin insulators is hydrated alumina, $Al_2O_3 \cdot 3H_2O$. A more correct name would be aluminum hydroxide $2Al(OH)_3$. This material contains the equivalent of about 35% water by weight. This water will start to come off at about 390° F. Hydrated alumina is soluble in alkalis and strong mineral acids. Hydrated alumina improves the arc track resistance of materials by encouraging oxidation of the carbon and by lowering surface temperature because of water evaporation. Like other fillers, hydrated alumina causes an increase in surface activity and can shorten insulator life when used in arc resistant resins. Leakage currents increase as chalking occurs on the surface of the filled resin body. As a consequence, the leakage current goes up, higher insulator temperatures occur despite water evaporation, the product has lower flashover values, erosion occurs at a higher and higher rate, and there is a greater tendency for the organic matrix to oxidize under the conditions of use.

Other conventional fillers which may be added to a BPA resin system do not exhibit the same fundamental problems as hydrated alumina, but represent difficulties of their own, allowing tracking to occur in a relatively short interval of time after products made therefrom have been placed in operational use.

Although initially thought to be very promising, cycloaliphatic epoxies have not been found to be the answer to all of the problems presented, thus resulting in only limited usage thereof for high voltage insulator applications. Relatively high material costs have been a major deterent to their widespread adoption.

Cycloaliphatic epoxy resin systems, particularly when filled with a material such as hydrated alumina, do initially exhibit relatively good arc track resistance. More than one reason probably exists for this phenomena. First, aliphatic resins contain more hydrogen than the previously used BPA aromatic epoxy resin. This abundance of hydrogen encourages the more complete oxidation of carbon in the molecule; hence, no carbon path. The overall reaction may be characterized as follows:

$$-CnH_{2n}- + 1.5nO_2 \rightarrow nCO_2 + nH_2O$$

The part that hydrogen plays in encouraging the oxidation of the carbon can probably be traced to breakup of the diatomic oxygen molecule, thus producing a very unstable oxygen atom which then tends to rapidly react with another hydrogen, carbon or oxygen atom in an effort to produce a stable system. The most likely candidate for this unstable oxygen to react with is the now unstable carbon atom that lost its hydrogen. The heat generated during these reactions accelerates the whole process and causes the remaining carbon and hydrogen to have an even greater affinity for oxygen. In the case of aromatic ring structures found in BPA resin systems, the alternating double bond in each aromatic ring stabilizes the structure through resonance making these carbon atoms less reactive with oxygen. The hydrogen deficiency of the aromatic structure limits the amount of energy liberated during burning. As a result, aromatic compounds tend to produce more carbon than aliphatic materials which increases the tendency of the composition to track as the temperature of the material goes up. This is believed to be one explanation of why cycloaliphatic epoxy resin systems have somewhat better arc track resistance than the more conventional BPA systems.

Furthermore, the addition of hydrated alumina $$(Al_2O_3 \cdot 3H_2O)$$

to the cycloaliphatic resin system increases the arc track resistance of the formulation by (1) cutting down on the concentration of the carbon containing resin; (2) providing oxygen for the combustion of carbon to $CO_2$; and (3) supplying water for evaporation. If arc track resistance was the only property that an insulator required, then the cycloaliphatic system would obviously be the one to use. However, even cycloaliphatic systems have inherent problems such as:

(1) cycloaliphatic resin systems must contain a filler to limit excessive cure shrinkage if cast in accordance with conventional relatively inexpensive casting procedures;
(2) the water in hydrated alumina is readily liberated when heated and, therefore, its use as a filler in an insulator causes high leakage currents, high insulator temperatures, lower flashover values, high erosion rates, and increases the tendency of the organic matrix of the product to oxidize;
(3) the use of a filler other than hydrated alumina permits tracking to occur after extended use of the insulator or other product under continuous high voltage stress thereon and the fillers tend to further limit the overall electrical properties of the cured system; and
(4) the cycloaliphatic resins generally do not have the strength of more conventional BPA epoxy resin compositions.

SUMMARY OF THE INVENTION

It has now been discovered that the outdoor performance (life) of a synthetic resin insulator under high voltage and temperature conditions can be greatly and unexpectedly improved by the addition of reactive modifiers to the base resin which impart the right balance of resiliency to the insulator product. The correct amount of resiliency has been obtained when the material resists erosion under electrical stress at low temperatures but not at higher temperatures. The upper temperature limit where rapid erosion is desirable is believed to be below the carbonization temperature of the material and in certain instances may be below the boiling point of water. This is to insure that at high temperatures erosion will be rapid enough to remove contamination at a faster rate than it tends to build up in order to avoid failure by flashover.

It is therefore the primary object of the present invention to provide a synthetic resin insulator for outdoor high voltage applications wherein at least the outer portion thereof is of a modified thermosetting resin such as a BPA epoxy plus flexibilizing additives and having the characteristics of resisting chalking and accumulation of contaminants on the surface thereof for extended periods of use under normal conditions but capable of undergoing rapid surface erosion at high temperatures and voltage loads to prevent failure by arc tracking.

It is also an object of the present invention to provide an outdoor high voltage electrical insulator formed of a curable thermosetting synthetic resin composition which is especially suitable for fabrication of insulators therefrom having good insulating properties as well as outstanding arc track resistance for an extended period of time even when a product fabricated from the composition is maintained under continuous high voltage energization in areas where environmental contamination is a factor and even when varying ambient conditions of high humidity and precipitation occur with substantial frequency.

Another important object of the invention is to provide an organic polymeric composition for construction of electrical insulating products therefrom especially useful in fabrication of insulators which are stronger, cheaper to maintain and lower in cost than their porcelain counterparts, and that also lends itself to being molded into a great variety of shapes that are functional as well as aesthetically appealing.

A still further object of the invention is to provide an outdoor high voltage electrical insulator formed of a curable synthetic resin wherein the resin composition is devoid of inorganic fillers without sacrifice to the arc track resistance of the insulator and thereby substantially obviating many of the problems which have heretofore been encountered in connection with filled resin insulating products.

Also an important object of the invention is to provide a polymeric insulator wherein a curable synthetic resin composition of the characteristics described is molded over a conventional synthetic resin, glass fiber reinforced member having good mechanical strength, but not as arc track resistant as the coating placed thereover whereby the composite product has not only outstanding mechanical integrity and durability even against sharp impacts such as may be caused by small caliber bullets or shotgun pellets but has exceptional electrical properties as well.

Another important object of the invention is to provide a polymeric composition which may be used as a substitute for porcelain in the production of insulating structural components useful in high voltage electrical applications wherein insulation, weatherability and structural strength are all necessary requisites and permitting the use of relatively low cost, readily available conventional BPA type epoxy resins as the base material by virtue of the fact that the weatherability and arc track resistance of the epoxy system is increased to superior levels by the addition of predetermined quantities of aliphatic polyglycidyl ethers or esters, along with small amounts of an alkylidene bis, tris, or polyphenol to the resin system. As a result, the requirement heretofore of adding inorganic fillers or equivalent substances to the epoxy resins in an effort to bring the physical and electrical properties thereof to acceptable values is completely avoided.

It is another object of the invention to provide an outdoor high voltage insulator fabricated of thermosetting hydrophobic synthetic resin compositions which have mechanical as well as electrical properties which are as good or better than the more expensive resin systems such as cycloaliphatic epoxies and which have better arc track resistance, impact strength, weatherability, and resistance to erosion as compared with resins such as the cycloaliphatic epoxies.

Also an object of this invention is to permit the use of a conventional BPA type epoxy resin as a substantial part of the matrix material of the resin composition permitting very large insulators and the like to be cast or molded from the resin composition without the necessity of adding fillers to the resin to compensate for shrinkage thereof during curing.

Other objects of the invention will become apparent or be explained in detail as the following specification progresses.

In accordance with the preferred concepts of the present invention, an elongated outdoor high voltage insulator of the type usually provided with spaced, circumferentially extending skirts is preferably fabricated of a polymeric composition comprising a glycidyl ether of a BPA type epoxy resin, which inherently has good dielectric and electrical resistance characteristics, exceptional mechanical strength and acceptable resistance to weathering, and which is rendered arc track resistant and even more weather resistant for extended periods of time by incorporation of 15% to 65% by weight of an aliphatic polyglycidyl ether or ester with an epoxy equivalency greater than one, and .01% to 3% by weight of an alkylidene bis, tris or polyphenol added to the resin composition. A curing agent for the epoxy resin is added to the formulation along with a conventional accelerator to speed up the curing reaction immediately prior to use thereof. It is primarily contemplated that the polymeric high impact, arc track and weather resistant thermoset hydrophobic synthetic resin composition be used as a coating over less arc track resistant, but stronger insulating members such as, but not limited to, glass reinforced synthetic resin materials such as those constructed from a glycidyl ether of a BPA type epoxy. The coating can be of any desired thickness and cured in the shape of skirts or weather sheds or any other shape designed to impart increased electrical leakage distance to the product fabricated from the resin composition. Exemplary of outdoor high voltage insulator products which can be fabricated from this system are electrical transmission and distribution accessories such as insulators of all types including conductor supports and spacers, hot line tools and particularly hot sticks, and boom members for telescopic and articulated aerial devices used in the construction and electrical utility fields.

Accordingly, the present invention provides outdoor high voltage electrical insulator products formed from a curable thermosetting synthetic resin composition wherein the principal constituent comprises an epoxy resin which is preferably 2,2-bis(p-hydroxyphenyl)propane-glycidyl ether polymer. An especially suitable epoxy resin is Epon 1001 distributed by Shell Chemical Company. From 15% to 65% by weight of a suitable aliphatic polyglycidyl ether or ester is included in the formulation for increasing the impact strength of the insulator formed therefrom and desirably, from 0.01% to 3% by weight of an alkylidene bis, tris or polyphenol to increase the weatherability of the product produced therefrom under varying ambient conditions. The alkylidene phenol functions as an antioxidant to increase the weather resistance of the insulating products under extreme outdoor conditions.

Although the present invention is most effectively carried out using an epoxy type resin and particularly a BPA type epoxy, it is to be appreciated that the principles hereof are applicable to various other resin systems wherein the principal synthetic resin is preferably of the thermosetting, hydrophobic type, as for example polyester and urethane resins.

One or more curing agents along with at least one accelerator are provided in the resin formulation at the time of fabrication of the insulator therefrom, to relatively rapidly cause the resin system to change into an infusible state of desired shape and configuration. The product fabricated from the resin system may be either made up entirely of the novel composition of this invention, or comprise a coating of desired thickness over a supporting body such as a glass reinforced unit containing 60% to 70% by weight of glass fibers having a BPA type epoxy resin as the matrix thereof.

For best results, the resilience increasing additive for the resin composition should either be an aliphatic polyglycidyl ether having the general formula

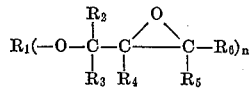

or an aliphatic polyglycidyl ester having the general formula

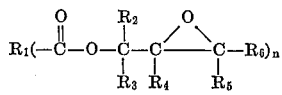

where $R_1$, $R_2$, $R_3$, $R_4$, $R_5$ and $R_6$ may be either hydrogen or any group or combinations of groups which are mainly aliphatic in nature (more than 50%) and $n$ is any number greater than or equal to 2.

In particular, it has been found that aliphatic polyglycidyl ethers and esters such as the following will significantly improve the arc track resistance of a conventional BPA type epoxy resin composition produced by reacting epichlorohydrin with Bisphenol A in the presence of sodium hydroxide.

(1) Poly glycidyl ether of castor oil.

(2) Triglycidyl ether of the digylceride of ricinoleic acid.

(3) Diglycidyl ether of butanediol.

[1,4-bis(2,3-epoxypropoxy)butane]

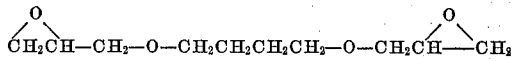

(4) Di(2-methyl)glycidyl ether of ethylene glycol

[1,2-bis(2,3-epoxy-2-methylpropoxy)ethane]

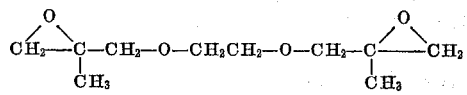

(5) Diglycidyl ether of polypropylene glycol

[polypropylene glycol di(2,3-epoxypropyl) ether]

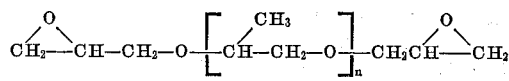

(6) Triglycidyl ether or glycerol

[1,2,3-tris(2,3-epoxypropoxy)propane]

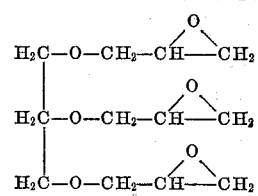

(7) Triglycidyl ether of trimethylolpropane

[2,2-bis(2,3-epoxypropoxymethyl)-1-(2,3 epoxypropoxy)butane]

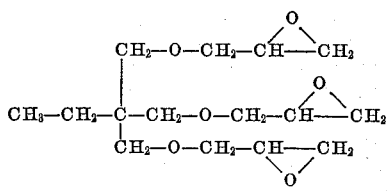

(8) Triglycidyl ester of linoleic trimer acid

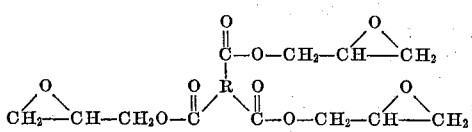

(9) Diglycidyl ester of linoleic dimer acid

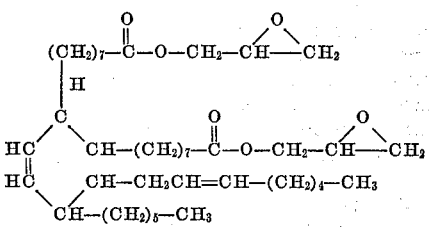

(10) D.E.R. 732. A flexible aliphatic diepoxide resin having an epoxide equivalent of 305–335 calculated as grams of resin containing one gram-equivalent of epoxide. A viscosity of 55–100 (cps. at 25%) and maximum color of 1 on the Gardner scale. Available from Dow Chemical Company, Midland, Mich.

(11) D.E.R. 736. Also available from Dow and comprising a flexible aliphatic diepoxide having a shorter chain length than D.E.R. 732. The epoxide equivalent weight is 175–205. The viscosity is 30–60 (cps. at 25° C.) and the Gardner color maximum is 1.

(12) Epon 871. Epoxy resin available from Shell Chemical Company, Houston, Texas and comprising a liquid having a maximum Gardner color of 12, a viscosity of 4–9 poises at 25° C. and an epoxide equivalent of 390–470 calculated as grams of resin containing one gram-equivalent of epoxide.

(13) Epi-Rez 505. An aliphatic polyglycidyl ether available from Celanese Resins Division of Celanese Coatings Company and having a viscosity of 300–500 cps. at 77° F., an epoxide equivalent weight of 550–650, a maximum Gardner-Holt color of 8 and an approximate flash point of 300° F.

Of the aliphatic polyglycidyl ethers and esters specifically listed above, best results have been obtained using Epi-Rez 505. It has been found in this respect that the polyglycidyl ethers of polyglyceride fatty acids are especially effective with the triglycidyl ether of the diglyceride of ricinoleic acid being a particularly useful example.

As previously noted, another important aspect of this invention is the inclusion of from 0.01% to 3% by weight of an alkylidene bis, tris, or polyphenol when maximum retention of physical properties is needed, particularly when the product fabricated from the preferred modified epoxy composition hereof is to be subjected to intense outdoor exposure. The alkylidene phenols serve as effective antioxidants to significantly increase the weatherability of the epoxy resin formulation prepared in accordance herewith.

For best results, the antioxidant for the resin system should be an alkylidene bis, tris or polyphenol having the general formula

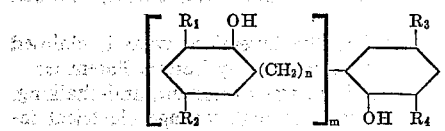

where $R_1$, $R_2$, $R_3$ and $R_4$ are alkyl groups and $n$ and $m$ are any whole number.

The alkylidene phenols listed hereunder have been found to be especially effective in increasing the weather resistance of an aliphatic polyglycidyl ether or ester modified BPA epoxy resin systems. Specific examples are as follows:

(1) 2,2'-methylenebis(4-methyl-6-tert-butylphenol)
(2) 2,2'-methylenebis(4-ethyl-6-tert-butylphenol)
(3) Advastab 405 of Advance Division of Carlisle Chemical Works.
(4) CAO-5, 14, 20 and 32 of Ashland Chemical Company.
(5) Irganox 565, 858 and 1010 og Geigy Industrial Chemicals.
(6) Naugawhite 34 of Uniroyal, Inc.
(7) Plastanox 425 and 1161 of American Cyanamid Company.
(8) Santowhite (refined) of Monsanto Company.

The invention described herein can best be understood by considering the following examples:

Example 1

Glass roving was impregnated with a curable synthetic resin formulation consisting of 100 parts by weight of the diglycidyl ether of Bisphenol A (prepared by condensing Bisphenol A with epicholorohydrin in the presence of sodium hydroxide, having a molecular weight of approximately 380 and available from Shell Chemical Company under the trademark Epon 828), 85 parts by weight of mixed isomers of methyltetrahydrophthalic anhydride, 3.6 parts of the 2-ethylhexoic acid salt of 2,4,6-tris(dimethylaminomethyl)phenol and 1.8 parts of pigmented paste using the epoxy resin identified above as a base therefor. The above composition contained approximately 60% glass by weight and was cured at 250–300° F. for 60 to 90 minutes in the shape of solid rods of various diameters between 9/16 inches and 2½ inches. Insulating members made from these rods were found to have a tensile strength of 80,000 p.s.i. and a modulus of elasticity of 2.5 x $10^6$ p.s.i. The rods were of light weight but began to show bare glass after several years exposure outdoors under electrical stress. Under severe contaminated conditions these insulating members also failed by virtue of arc tracking. When placed on an arc track testing machine, 8 inch long samples failed by carbonization in 30 to 50 hours. In this test procedure, the rods of designated length are placed on a 48 inch diameter wheel rotatable about a horizontal axis and rotated while 6 inches of each rod are energized at 10KV. Water is sprayed onto the samples at the bottom of the arc. Samples are rated as hours to failure by carbonization or erosion. If no failure occurs after either 500 or 1,000 hours, the degree and, therefore, rate of erosion is measured.

Example 2

Various shapes were cast for testing using the following formulation:

40 parts by weight of the diglycidyl ether of Bisphenol A resin described in Example 1.
60 parts by weight of Epi-Rez 505.
52 parts by weight of mixed isomers of methyltetrahydrophthalic anhydride.
3.1 parts of the 2-ethylhexoic acid salt of 2,4,6-tris(dimethylaminomethyl)phenol.

Samples were cured at 250–300° F. for 2 to 3 hours. Impact tests were conducted on the samples using ASTM method number D256-56 except that unnotched samples were tested. The unnotched izod values were 25–30 foot-lbs. per inch, but dropped to below 10 ft.-lbs. per inch after 200 hours in an Atlas twin arc Weather-Ometer. The material did not track on the tracking wheel referred to in Example 1 even after 1,000 hours exposure, but eroded at an approximate rate of 5 milligrams per cm.$^2$ of surface area per week.

Similar results were obtained when this formulation was cast around one of the solid reinforced epoxy rods described in Example 1. When this formulation was cast around solid reinforced epoxy rods in the shape of skirts or watersheds cure shrinkage marks were visible on the surface of the insulator. In several cases excessive parting agent was put on the mold used to cast the insulators. This caused the insulators to start to track (carbonize) along the parting line during test. Unexpectedly, after further exposure the insulator cleaned itself up and the carbonized area eroded away.

Example 3

Samples were cast using the same formulation and method for Example 2 except in this case 1 part by weight of 2,2'-methylenebis(4-methyl-6-tert-butylphenol) was also added. The samples were found to have properties very similar to those described in Example 2 except initial unnotched izod values were retained after 500 hours in the Atlas twin arc Weather-O-Meter.

Example 4

Various shapes were cast for testing using the preferred following formulation:

50 parts by weight of the diglycidyl ether of a Bisphenol A resin as described in Example 1, but having a molecular weight of approximately 840 and available from Shell Chemical Company under the trademark Epon 1001.
50 parts by weight of Epi-Rez 505.
30 parts of mixed isomers of methyltetrahydrophthalic anhydride.
2.6 parts of the 2-ethylhexoic acid salt of 2,5,6-tris(dimethylaminomethyl)phenol.
1 part of 2,2'-methylenebis(4-methyl-6-tert-butylphenol).
1.3 parts of gray epoxy paste.

The results obtained were similar to those obtained in Example 3 except that surface imperfections due to cure shrinkage were eliminated. Outdoor tests under service conditions after three years exposure confirmed the results predicted by the accelerated tracking wheel test described above.

Although only a selected number of curing agents and accelerators have been specifically identified in the examples above, it is to be understood that a wide variety of equivalent agents used for curing epoxy resins and accelerating the cross-linking reaction may be employed in the resin formulation with equally good results. Thus, the results obtainable from the practice of this invention are not limited to the use of a particular amine or other type of curing agent or a specific accelerator.

It is believed that the arc track resistance of aromatic epoxy resin systems and equivalent resins is significantly increased without incorporation of fillers therein, upon addition of flexibilizing additives which increase the impact strength of the cured resin products by rendering the infusible composition somewhat more resilient. In the absence of such flexibilizing agent or agents, the hardened aromatic epoxy resin either modified or with a conventional inorganic filler is of molecular structure and rigidity such that it is vulnerable to surface crazing deterioration and excessive chalking when subjected to alternating current, high voltage stress for a period of time sufficient to significantly increase the temperature thereof, particularly to levels about the boiling point of water and especially temperatures approaching the carbonization point of the resin composition. However, the material must not be too resilient since in highly contaminated areas, contamination would build up on the surface by virtue of absorption of energy and inability of the surface of the resin product to erode away at a sufficiently fast rate to prevent increase of high leakage currents and failure by flashing over instead of tracking. A very limited degree of erosion is therefore necessary to compensate for contamination of the insulating products in use under service conditions. Thus, a sufficient quantity of one or more reactive modifiers should be added to incorporate the right balance of resiliency to the system. The correct amount of resiliency has been obtained when the material resists erosion under electrical stress at low temperatures but not at higher temperatures. The upper temperature limit is below the carbonization temperature of the insulator composition. It has, therefore, been determined that the optimum concentration of the material serving to increase the resiliency of the epoxy system, and thereby its impact strength and corresponding arc track resistance, depends on the functionality and polarity of the resin system chosen. More polar and/or more cross-linked resins require a higher concentration of the resiliency increasing additive. The present invention has greatest applicability to conventional BPA epoxy resins having an epoxide equivalent weight of from 110 to 800.

It has been found though that optimum arc track resistance and erosion rates are obtained when a sufficient amount of the additive or additives for increasing the resilience and thereby the impact strength of the cured synthetic resin insulator product, are added to cause the cured resin composition to have an unnotched izod impact strength greater than 15 ft.–lbs./in. (preferably greater than 20) and a Shore D hardness between 80 and 40, whereby the insulator resists surface erosion under alternating current high voltage stress at low temperatures but undergoes controlled surface erosion at higher destructive temperatures.

In essence therefore, it has been found that the arc track resistance of an insulating product made from a thermosetting synthetic resin such as a BPA epoxy system can be significantly increased by incorporation of resiliency modifiers in the resin so long as care is taken to prevent the final cured product from being so resilient that it fails to erode slightly under high electrical leakage conditions producing high temperatures. In addition, the cured composition must not be so rigid as to produce substantial chalking as previously described which would also lead to failure.

Since it is somewhat less expensive, and a stronger product can be produced by coating a base supporting member with the resin system of this invention, this is the preferred product. Although it is to be recognized that such laminated insulator structure is not a requirement from the standpoint of its functional utility, the base member preferably contains from 60% to 70% by weight of reinforcing glass and, thus, substantially lessens the amount of resin which must be provided for the overall product in view of the fact that the modified resin system of this invention need be placed over only the glass reinforced inner member in covering relationship to at least the part thereof which is exposed to the ambient atmosphere. Furthermore, good adhesion is obtained between the modified resin outer covering and the supporting member since both are basically epoxy resins which are fully compatible, one with the other. This outstanding adhesion is in large measure attributable to reactive groups on the surface of the inner glass reinforced member which are available for reaction with active sites on the proximal portions of the outer covering cast therearound. These reactive sites consist of hydroxyl groups, residual unreacted epoxy groups, acid groups, and/or anhydride groups. Additional adhesion is also obtained through van der Walls forces, between polar groups.

Having thus described the invention, what is claimed as new and desired to be secured by Letters Patent is:

1. A high impact and arc track resistant, anti-chalking, filler free, outdoor, polymeric high voltage electrical insulator comprising:
   an elongated body having at least the outermost portion thereof formed of a synthetic resin composition including a hydrophobic, thermosetting, aromatic epoxy resin and a sufficient amount of a curing agent therefor to cure the resin to a rigid, hard, infusible state;
   from about 15% to 65% by weight, based upon the total weight of the synthetic resin composition employed in forming said portion of the body, of a flexibilizing agent selected from the group consisting of aliphatic polyglycidyl ethers having the general formula

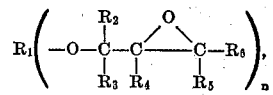, and aliphatic polyglycidyl esters having the general formula

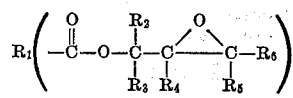

wherein each individual group $R_1$, $R_2$, $R_3$, $R_4$, $R_5$ and $R_6$ is separately selected from the group consisting of hydrogen and a radical which is primarily aliphatic in character, and $n$ is a number equal to or greater than 2,
   said flexibilizing agent being capable in the amounts utilized to cause the cured synthetic resin to have an unnotched izod impact strength greater than about 15 ft. lb./in. and a Shore D hardness within the range of about 40 to approximately 80.

2. An insulator as set forth in Claim 1 wherein said body is provided with a plurality of external, spaced, circumferentially extending, outwardly projecting skirts integral with said portion of the body.

3. An insulator as set forth in Claim 1 wherein said resin is a 2,2-bis(p - hydroxyphenyl)propane-glycidyl ether polymer.

4. An insulator as set forth in Claim 1 wherein said epoxy resin has an equivalent epoxide weight between about 110 and 800.

5. An insulator as set forth in Claim 1, wherein said flexibilizing agent is an aliphatic polyglycidyl ether having an epoxide equivalency greater than 1.

6. An insulator as set forth in Claim 5, wherein said flexibilizing agent comprises a polyglycidyl ether of a polyglyceride of a fatty acid.

7. An insulator as set forth in Claim 5, wherein said flexibilizing agent is a polyglycidyl ether of castor oil.

8. An insulator as set forth in Claim 5, wherein said flexibilizing agent is a triglycidyl ether of the diglyceride of ricinoleic acid.

9. An insulator as set forth in Claim 1 wherein said resin composition includes in approximate parts by weight, 50 parts of 2,2 - bis(p-hydroxyphenyl)propane-glycidyl ether polymer having a molecular weight of approximately 840, 50 parts of a polyglycidyl ether of castor oil, 30 parts of mixed isomers of methyltetrahydrophthalic anhydride, 2.6 parts of 2-ethylhexoic acid salts of 2,4,6-tris (dimethylaminomethyl)phenol and 1 part of 2,2'-methylenebis(4-methyl-6-tert-butylphenol).

10. An insulator as set forth in Claim 1, wherein said resin composition includes in approximate parts by weight, 40 parts of 2,2 - bis(p-hydroxyphenyl)propane-glycidyl ether polymer having a molecular weight of approximately 380, 60 parts of a polyglycidyl ether of castor oil, 52 parts of mixed isomers of methyltetrahydrophthalic anhydride, and 3.1 parts of 2-ethylhexoic acid salt of 2,4,6-tris (dimethylaminomethyl)phenol.

11. An insulator as set forth in Claim 1, wherein is included an antioxidant having the general formula

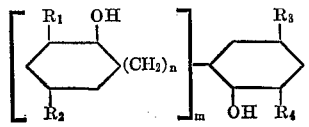

where $R_1$, $R_2$, $R_3$ and $R_4$ each comprises an alkyl group and $n$ and $m$ each comprises a whole number.

12. An insulator as set forth in Claim 1, wherein is included an antioxidant selected from the group consisting of alkylidene bis, tris, and polyphenols.

13. An insulator as set forth in Claim 12, wherein is provided from about 0.01 to 3% by weight of said antioxidant therein.

14. An insulator as set forth in Claim 5, wherein is included 2,2'-methylenebis(4-methyl-6-tert-butylphenol) as an antioxidant.

15. An insulator as set forth in Claim 5, wherein is included 2,2'-methylenebis(4-ethyl-6-tert-butylphenol) as an antioxidant.

16. An insulator as set forth in Claim 1 wherein said portion is formed over an internal support member.

17. An insulator as set forth in Claim 16 wherein said support member is of synthetic resin material provided with a multitude of individually, essentially parallel glass fibers therein extending longitudinally of the member in reinforcing relationship thereto.

References Cited
UNITED STATES PATENTS

| | | | |
|---|---|---|---|
| 3,475,546 | 10/1969 | Sadler | 252—63.5 X |
| 3,535,289 | 10/1970 | Kato et al. | 252—63.2 X |
| 3,551,551 | 12/1970 | Hogi | 252—63.5 X |
| 3,571,491 | 3/1971 | Markowski | 252—63.2 X |
| 3,622,537 | 11/1971 | Needham et al. | 252—63.2 X |
| 3,645,899 | 2/1972 | Linson | 252—63.5 |

STEPHEN J. LECHERT, JR., Primary Examiner

U.S. Cl. X.R.

252—63.5, 64